(12) United States Patent
Chanod

(10) Patent No.: US 6,269,189 B1
(45) Date of Patent: Jul. 31, 2001

(54) FINDING SELECTED CHARACTER STRINGS IN TEXT AND PROVIDING INFORMATION RELATING TO THE SELECTED CHARACTER STRINGS

(75) Inventor: Jean-Pierre Chanod, Grenoble (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,549

(22) Filed: Dec. 29, 1998

(51) Int. Cl.$^7$ .................................................. G06K 9/72
(52) U.S. Cl. ............................................................ 382/229
(58) Field of Search .................................... 382/229, 230, 382/227, 228, 231, 232, 154, 209, 215, 217, 218; 704/251, 240, 255

(56) References Cited

U.S. PATENT DOCUMENTS

| | | | |
|---|---|---|---|
| 5,377,281 | * 12/1994 | Ballard et al. | 382/40 |
| 5,488,719 | * 1/1996 | Kaplan et al. | 395/600 |
| 5,559,897 | * 9/1996 | Brown et al. | 382/186 |
| 5,721,939 | 2/1998 | Kaplan | 395/759 |
| 5,748,805 | 5/1998 | Withgott et al. | 382/306 |
| 5,920,836 | * 7/1999 | Gould et al. | 704/251 |

FOREIGN PATENT DOCUMENTS

| | | |
|---|---|---|
| 0 374 241 B1 | 8/1997 | (EP) . |
| 0 822 501 A2 | 2/1998 | (EP) . |
| WO 97/48058 | 12/1997 | (WO) . |

OTHER PUBLICATIONS

Chanod, Jean–Pierre et al. "A Lexical Interface for Finite–State Syntax," Technical Report MLTT–025, Rank Xerox Research Centre Grenoble Laboratory, Feb. 9, 1996.

Chanod, Jean–Pierre et al. "A Non–Deterministic Tokeniser for Finite State–Parsing," 12$^{th}$ European Conference on Artificial Intelligence, 1996.

Chanod, Jean–Pierre et al. "A Robust Finite–State Parser for French," Jul. 5, 1996.

Karttunen, Lauri "Constructing Lexical Transducers," The Proceedings of the Fifteenth International Conference on Computational Linguistics, Kyoto, Japan; Aug. 5–9, 1994, pp. 406–411.

Karttunen, Lauri "Directed Replacement," The Proceedings of the 34$^{th}$ Annual Meeting of the Association for Computational Linguistics, ACL–96, Santa Cruz, California; Jun. 23–28, 1996.

* cited by examiner

*Primary Examiner*—Andrew W. Johns
*Assistant Examiner*—Seyed Azarian

(57) ABSTRACT

Selected character strings are automatically found by performing an automatic search of a text to find character strings that match any of a list of selected strings. The automatic search includes a series of iterations, each with a starting point in the text. Each iteration determines whether its starting point is followed by a character string that matches any of the list of selected strings and that ends at a probable string ending. Each iteration also finds a starting point for the next iteration that is a probable string beginning. The selected strings can be words and multiple word expressions, in which case probable string endings and beginnings are word boundaries. A finite state lexicon, such as a finite state transducer or a finite state automation, can be used to determine whether character strings match the list of selected strings. A tokenizing automation can be used to find starting points.

18 Claims, 6 Drawing Sheets

FINDING SELECTED CHARACTER STRINGS IN TEXT AND PROVIDING INFORMATION RELATING TO THE SELECTED CHARACTER STRINGS

FIELD OF THE INVENTION

The invention relates to techniques that find selected character strings in text.

BACKGROUND AND SUMMARY OF THE INVENTION

U.S. Pat. No. 5,748,805 discloses a technique that provides translations for selected words in a source document. An undecoded document image is segmented into image units, and significant image units such as words are identified based on image characteristics or hand markings. For example, a user could mark difficult or unknown words in a document. The significant image units are then decoded by optical character recognition (OCR) techniques, and the decoded words can then be used to access translations in a data base. A copy of the document is then printed with translations in the margins opposite the significant words.

U.S. Pat. No. 5,748,805 also discloses a technique applicable in a reading machine for the blind. The user can designate key words on a key word list. The user designated key words can then be found in the document, such as by OCR techniques, and regions around the key word can be identified as significant. Significant words can be decoded using OCR techniques and supplemental data can be retrieved and provided in a Braille version or speech synthesized version to the user.

Karttunen, L., "Directed Replacement", in Proceedings of the 34$^{th}$ Annual Meeting of the Association for Computational Linguistics, Santa Cruz, Calif., 1996, pp. 108–116, discloses a family of directed replace operators, written "UPPER @->LOWER", that can be implemented in finite state transducers (FSTs). A transducer is disclosed that transduces an input string from left to right, making only the longest possible replacement at each point. This can be thought of as a procedure that copies the input until it finds an instance of UPPER; then the procedure selects the longest matching substring, which is rewritten as LOWER, and proceeds from the end of that substring without considering any other alternatives. The result is that the input string is parsed into a sequence of substrings that are either copied to the output unchanged or replaced by some other strings. Applications include tokenizing transducers that insert an end of token mark at the end of each multiword token in a list (which may include overlapping expressions), filtering transducers that divide an input stream into regions that are passed on and regions that are ignored, and marking transducers that mark instances of a regular language without otherwise changing text.

Chanod, J.-P., and Tapanainen, P., "A Lexical Interface for Finite-State Syntax", Technical Report MLTT-025, Rank Xerox Research Centre, Grenoble Laboratory, 1996, pp. 1–22, describe a lexical interface as implemented and used for development of a French constraint grammar. The lexical interface analyzes sentences. Tokenization uses (1) a multiword expression lexicon that encodes basic multiword expressions (MWEs), numerical or time expressions, and general regular expressions and (2) a tokenizing automation that recognizes simple tokens without considering whether they belong to the language. Morphological analysis is performed using several ordered lexical transducers, referred to as a lexicon stack, with the first transducer to recognize a token determining its lexical interpretation. The top lexicon in the stack is the multiword expression lexicon described above; second are one or more real lexicons; third is a guesser that accepts anything and always gives an analysis; and, lastly, the default lexicon matches any string to a noun.

During tokenization, a sentence string is read from the left, and the longest substring matched either in the tokenizing automation or the multiword expression lexicon is identified as a token; the process iterates with the rest of the sentence. Tokens matched in the automation are then looked up in the lexicon stack to obtain morpho-syntactic information, ignoring the top lexicon; tokens matched in the top lexicon do not require further lookup, as the lexicon is a transducer that provides the relevant morpho-syntactic information. The lexicons produce a finite-state network for each token, and the analyses are concatenated to form a finite-state network with all possible readings for a sentence.

These techniques are further described in Chanod, J.-P., and Tapanainen, P., "A Non-deterministic Tokeniser for Finite-State Parsing", in ECAI'96, 12$^{th}$ European Conference on Artificial Intelligence, Workshop on Extended Finite-State Models of Language, 1996, pp. 10 and 11 and Chanod, J.-P., and Tapanainen, P., "A Robust Finite-State Parser for French", ESSLLI'96 Workshop on Robust Parsing, Aug. 12–16, 1996, Prague, Czech Republic.

The invention addresses problems that arise in automatically finding selected words, multi-word expressions, or other strings of characters in text. Automatic string finding is useful in a variety of applications that use information about the presence, locations, and frequencies of selected strings in text. For example, an application could insert a translation, a hypertext link, or another annotation in association with each selected string that occurs in a text.

If an automatic string finding system were to use elaborate linguistic tools such as general lexicons, part-of-speech disambiguators, and syntactic analyzers, the system would be memory- and computation-intensive and, therefore, slow and expensive. In addition, unless it were made even more complex, the system would be specific to one language, and possibly to a single domain of terminology. These problems are collectively referred to herein as the "complexity problems".

The invention is based on the discovery of new techniques for finding character strings in text. The new techniques alleviate the complexity problems, providing simpler automatic string finding. The techniques automatically search a text to find character strings in the text that match any of a list of selected strings. In doing so, the techniques perform a series of iterations, each with a starting point in the text. Each iteration determines whether its starting point is followed by a character string that matches any of the selected strings and that ends at a probable string ending. Then, the iteration finds the next iteration's starting point at a probable string beginning.

Each iteration thus performs an operation that determines whether a starting point in the text is followed by a matching character string ending at a probable string ending. Each iteration also performs an operation that finds a probable string beginning as a starting point for the next iteration. Both of these operations can be performed very rapidly with tools that are already available or can be easily constructed. Therefore, the new techniques can be readily implemented to obtain a simple, fast automatic string finder.

To find probable string beginnings and endings, for example, the new techniques can perform tokenizing, such as with a finite state tokenizer, to find probable token breaks such as word separators. Where each of the selected strings begins and ends at a token break, as would be true for words and multiword expressions, tokenization will find probable string beginnings and endings.

To determine whether a starting point is followed by one of the selected character strings, the new techniques can further use a finite state data structure, such as a finite state transducer (FST) or a finite state automation (FSA), as a lexicon of the selected strings. The finite state data structure can include acceptance data that are accessed after matching an acceptable character string. The acceptance data thus indicate that the string is acceptable. An FST could have a level that accepts only selected character strings, and an FSA can similarly accept only selected character strings.

The techniques can access the finite state data structure and the tokenizer with the string of characters that follows a starting point, seeking to match each character in turn. Based on any failure to match a character and on any acceptance data that are accessed, the techniques can determine whether the starting point is followed by an acceptable character string that ends at a probable string ending.

When a character string matches one of the selected strings and ends at a probable string ending, the new techniques can determine whether to perform an operation relating to the matching string. For example, the new techniques can determine to perform such an operation only for the longest matching string that begins at the starting point.

If the finite state data structure is an FST, the new techniques can provide the character string following the starting point to a string matching level of the FST. The FST can, if the string is acceptable, provide information output relating to the string at an information output level. For example, the information output can be information useful for annotating the accepted string or for performing another operation relating to the accepted string, or it can be access data for accessing such information.

Alternatively, the new techniques can provide the character string following the starting point to an FSA. If the character string is accepted by the FSA, the techniques can obtain a counterpart number to which the character string maps. The new techniques can then use the counterpart number to access information relating to the accepted string.

Operations that could be performed include, for example, obtaining an annotation, such as a translation, a hyperlink or other handle for accessing related information, any interactive aid for accessing related documents, or other information associated with the matching string. If the associated information is an annotation, the operation can also insert the annotation into the text.

The new techniques can further be implemented in a system that includes text data defining a text, list data defining a list of selected character strings, and a processor that performs iterations as described above to automatically search the text to find character strings that match any of the list.

The new techniques can also be implemented in an article of manufacture for use in a system that includes text data defining a text and a storage medium access device. The article can include a storage medium and list data and instruction data stored by the storage medium. The system's processor, in executing the instructions indicated by the instruction data, performs iterations as above.

The new techniques can also be implemented in a method of operating a first machine to transfer data to a second over a network, with the transferred data including list data and instruction data as described above.

The new techniques are advantageous because they can be implemented with simple, inexpensive linguistic resources such as a tokenizer and a lexicon in the form of an FST or FSA. In addition, the new techniques lend themselves to fast operation, because tokenizing is a quick preliminary stage and lexicon lookup is also fast. The new techniques are especially fast when compared with string finding techniques that depend on morphological analysis. The new techniques also can be readily adapted to new domains of terminology or to new languages, simply by producing a tokenizer and a lexicon of selected words.

The new techniques are also advantageous because they only search for selected strings, and therefore will rarely find a string that is not of interest. And the computationally simple implementations of the new techniques will rarely fail to find an occurrence of one of the selected strings.

The following description, the drawings, and the claims further set forth these and other aspects, objects, features, and advantages of the invention.

DETAILED DESCRIPTION OF THE INVENTION

A. Conceptual Framework

Figure 1:
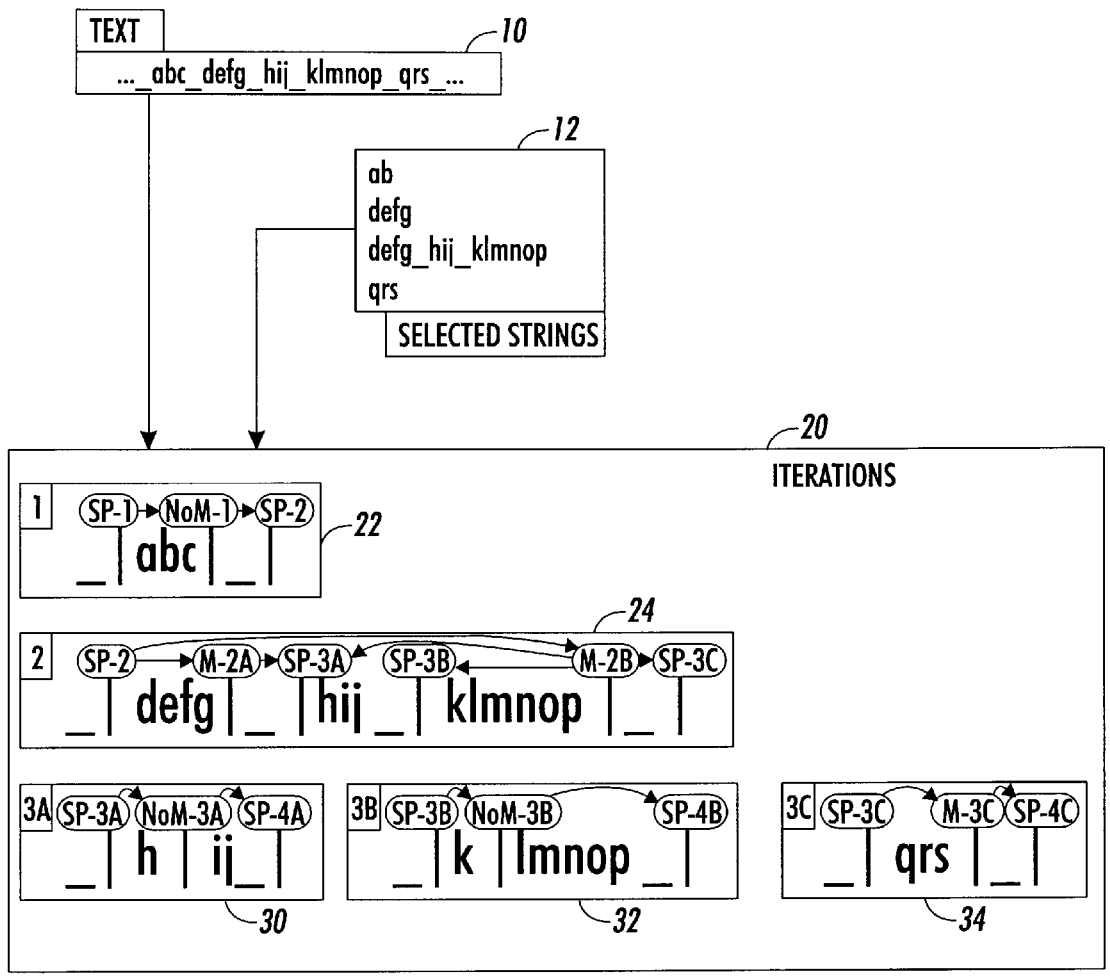
FIG. 1 is a schematic flow diagram showing how to automatically search text to find character strings that match any of a list of selected character strings.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values". For example, a binary item of data, also referred to as a "bit", has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

A processor performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor "accesses" an item of data in memory by any operation that retrieves or modifies the item or information within the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary. The natural languages include ancient languages such as Latin, ancient Greek, ancient Hebrew, and so forth, and also include synthetic languages such as Esperanto and Unified Natural Language (UNL).

"Character" means a discrete element that appears in a written, printed, or phonetically transcribed form of a natural language. Characters in the present day English language can thus include not only alphabetic and numeric elements, but also punctuation marks, diacritical marks, blanks, spaces, capitalizations, tabulations and other format characters, mathematical and logical symbols, and other elements used in written, printed, or phonetically transcribed English. More generally, characters can include, in addition to alphanumeric elements, phonetic, ideographic, or pictographic elements.

A "character code" is an item of data that has a value indicating one of a set of characters. One set of one-byte character codes commonly used for English is referred to as ASCII, but there are many others, including supersets of ASCII such as ISO 8859-1 and Codepage 850 for Western European languages, two- and three-byte character codes for languages such as Chinese, and two- and four-byte versions of the UNICODE, a character code set that attempts to unify all character sets.

As used herein, the notions of "word" and "separator" or "break" are closely related: A "separator" or "break" (or "word separator" or "word break") is a string of one or more elements that meets a criterion for separating words (a "break criterion"), while a "word" is a string of one or more elements, each of which is a character or a combination of characters, where the string does not include an internal separator according to the applicable break criterion. Break criteria applicable to languages such as French and English often treat strings of one or more spaces as word separators. In addition to correctly spelled words, abbreviations, acronyms, contractions, misspellings and nonsense words, mathematical and logical expressions including formulas and equations, combinations of punctuation marks that do not meet a break criterion (such as dotted lines, signature lines, "smileys", etc.), and various other types of strings of characters, whether or not semantically meaningful, can all be words under this definition if they do not include internal separators under an applicable criterion. Also, SGML and XML tags and other such strings of characters relating to hyperlinking, formatting, and so forth, are treated as words under some break criteria. To differentiate this meaning from the sense in which a word must be a semantic unit, words obtained by applying a break criterion are sometimes referred to herein as "tokens", and breaks between tokens may be referred to as "token breaks".

A "text" is a series of characters that forms a series of words (or tokens) separated by word separators. A text may be "defined", for example, by a written or printed series of characters or by an item of data that includes a series of character codes.

To "tokenize" is to divide a text into tokens according to a break criterion. A "tokenizer" is used herein to mean a data structure, program, object, or device that can be used to tokenize text.

A "selected character string" is a character string that has been chosen in any way, whether automatically, semiautomatically, or manually.

To "find" a character string in text is to perform an operation that begins without information about the presence or position of the character string in the text and ends with information indicating that the character string is present and/or indicating its position.

To "search" a text to find a character string is to perform an operation that attempts to find the character string in the text.

As used herein, a "series of iterations" is a series of operations that can be divided into two or more consecutive parts, each of which is referred to herein as an iteration. Although iterations in a series may differ significantly, each iteration after the first can typically use starting data produced by the preceding iteration to obtain ending data. Typically, each iteration's ending data can in turn be used by the following iteration as its starting data.

A "starting point" in a text is a position within the text at which some operation can be started.

A starting point in a text is "followed" by a character string if the character string begins at the starting point.

A "probable string ending" is a position within a text that has a higher than average probability of being a string ending for some set of strings. Similarly, a "probable string beginning" is a position within a text that has a higher than average probability of being a string beginning for some set of strings. For example, for words and multiword expressions in languages such as French and English, probable string endings and beginnings occur at positions such as before or after spaces, which are likely to separate words.

A finite state automation (FSA) is a data processing system having a finite number of states and transitions (or arcs), each transition originating in a state and leading to a state, and in which each transition has one or more associated values. As a result, an FSA can respond to an input signal indicating a value by following a transition with a matching value.

A finite state transducer (FST) is an FSA in which each transition has associated values on more than one level. As a result, an FST can respond to an input signal indicating a value on one of the levels by following a transition with a matching value on the level and by providing as output the transition's associated value at another level. A two-level transducer, for example, can be used to map between input and output strings, and if the values are character types, the input and output strings can be words.

The term "finite state data structure" is used herein to mean a data structure containing information sufficient to define the states and transitions of an FSA or an FST.

A "tokenizing automation" is a finite state data structure that is a tokenizer.

A "lexicon" is used herein to mean a data structure, program, object, or device that indicates a set of character strings. A lexicon may be said to "accept" a string it indicates, and those strings may thus be called "acceptable" or may be referred to as "in" or "occurring in" the lexicon.

A "finite state lexicon" is a lexicon that is a finite state data structure.

The term "list of selected character strings" is used herein in the generic sense of a lexicon that indicates a set of selected character strings. The lexicon could, for example, be a finite state data structure, a list data structure, or any other appropriate type of lexicon.

A character string "matches" one of a list of selected character strings if the character string satisfies a criterion for being the same as the selected string. For example, the criterion could require that two strings have exactly the same characters or that the only differences between characters are differences between upper and lower case or differences between diacritical marks.

B. General Features

Figure 2:
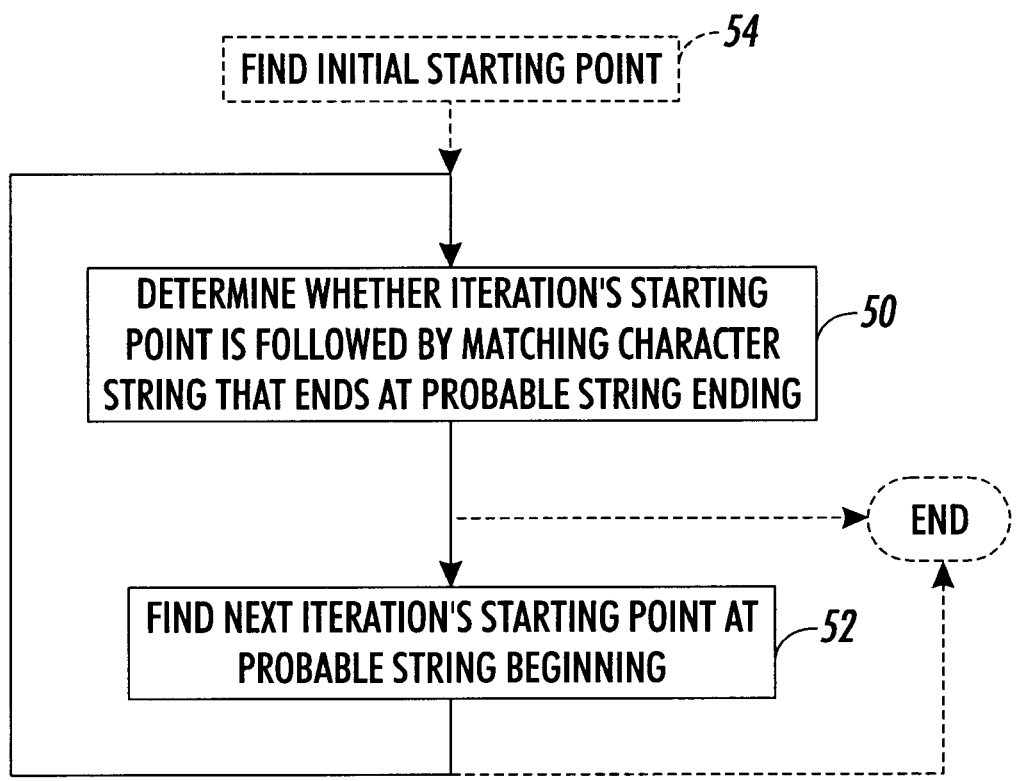
FIG. 2 is a flow chart showing general acts in automatically searching text to find character strings that match any of a list of selected character strings.
Figure 3:
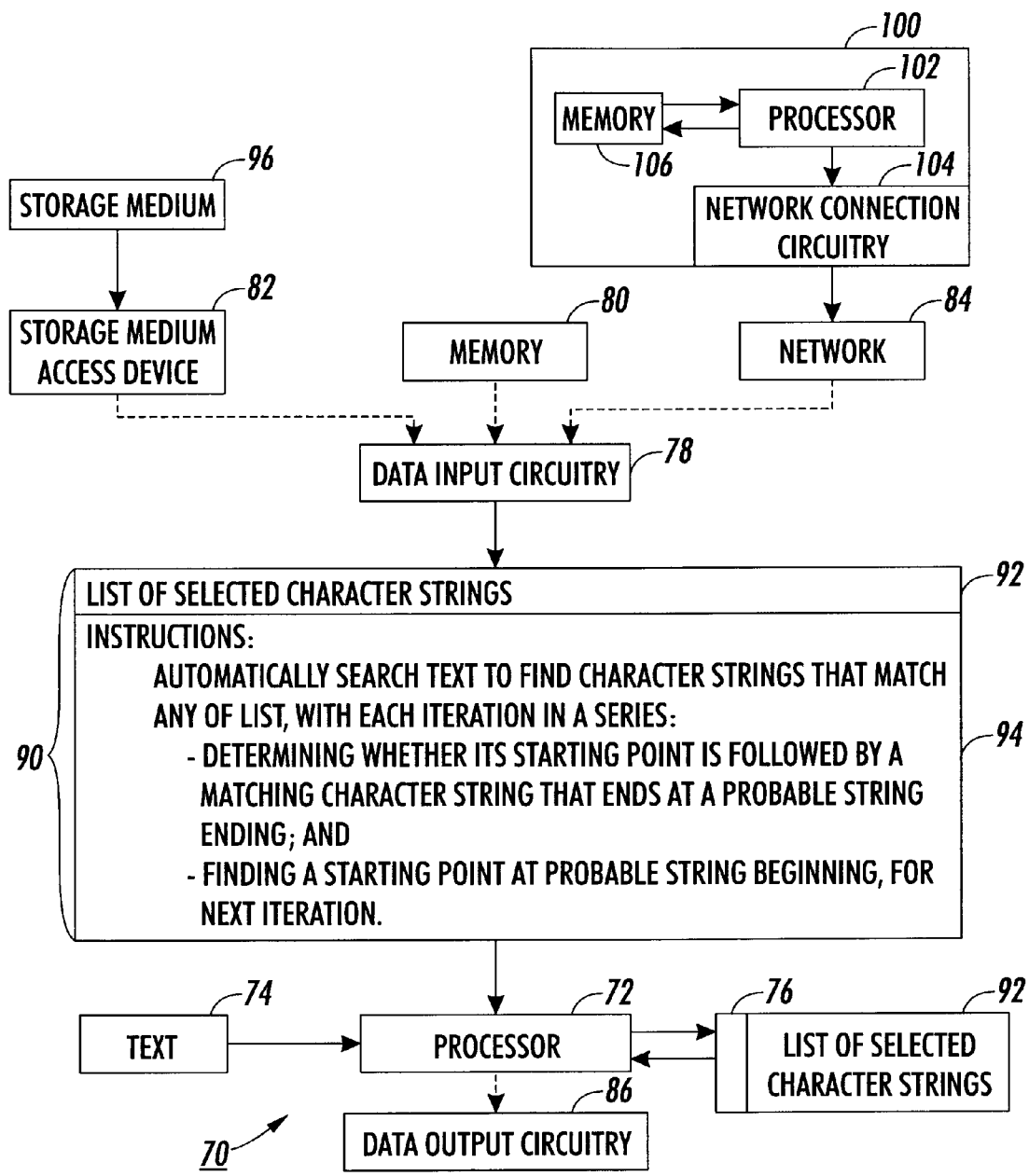
FIG. 3 is a schematic diagram showing components of a system that can perform the general acts in FIG. 2.

FIGS. 1–3 illustrate general features of the invention.

FIG. 1 is a flow diagram that shows schematically how to automatically find selected character strings in text.

Text 10 is illustratively a series of character codes, within which are five words, "abc", "defg", "hij", "klmnop", and "qrs". Each word is bounded before and after by a space character or other word separator, illustratively represented by "_". In the simple example of FIG. 1, the position immediately before each word separator is a probable string ending and the position immediately after each word separator is a probable string beginning.

List 12 is a list of selected character strings, illustratively the four strings "ab", "defg_hij_klmnop", and "qrs". Of these four, the first, second, and fourth are single words, while the third is a multi-word expression (MWE) that begins with a word that is also the second selected string.

Box 20 shows a series of iterations that can be performed in automatically finding the selected strings of list 12 in text 10. Each iteration or alternative within an iteration is identified by a number or a number+letter identifier, i.e. 1, 2, 2A, 2B, 3A, 3B, and 3C. The nth iteration includes a starting point for the iteration (shown in the form "SP–n"), at least one matching ("M–n") or non-matching ("NoM–n") determination, and at least one starting point for the next iteration ("SP-(n+1)").

Iteration 1 in box 22 has its starting point (SP-1) immediately after the first word separator, preceding the word "abc". Even though "ab" is in list 12, it does not result in a matching determination because its ending in text 10 is not at a probable string ending point. The next probable string ending point is immediately after the next character, but because "abc" is not in list 12, iteration 1 makes a non-matching determination (NoM-1). Then iteration 1 illustratively finds a starting point for iteration 2 (SP-2), immediately after the word separator following the word "abc".

Iteration 2 in box 24 can make two matching determinations (M-2A and M-2B), the first after matching the word "defg" and the second after matching the MWE "defg_hij_klmnop", each of which ends at a probable string ending in text 10, immediately before a word separator. Depending on the implementation, either matching string could be treated as found, and the search could continue appropriately.

FIG. 1 shows three possible starting points that could be found for iteration 3 (SP-3A, SP-3B, and SP-3C), each of which is a probable string beginning. The first (SP-3A) immediately follows the first word separator found by going forward from iteration 2's starting point (SP-2) or after the first matching determination (M-2A); the second (SP-3B) immediately follows the first word separator found by going backward from the second matching determination (M-2B); and the third (SP-3C) immediately follows the first word separator found by going forward from the second matching determination (M-2B).

If the implementation chooses the longest matching string that begins at a starting point, search will continue from the second matching determination (M-2B). Depending on how the implementation finds the next iteration's starting point, however, the third iteration could begin from any of the possible starting points (SP-3A, SP-3B, or SP-3C).

Iteration 3A in box 30 illustratively begins at the first starting point (SP-3A). Because none of the selected words in list 12 begins with "h", iteration 3A makes a non-matching determination (NoM-3A). Then iteration 3A illustratively finds a starting point for iteration 4 (SP-4A), immediately after the word separator following the word "hij".

Similarly, iteration 3B in box 32 illustratively begins at the second starting point (SP-3B). Because none of the selected words in list 12 begins with "k", iteration 3B also makes a non-matching determination (NoM-3B). Then iteration 3B illustratively finds a starting point for iteration 4 (SP-4B), immediately after the word separator following the word "klmnop".

On the other hand, iteration 3C in box 34 makes a matching determination (M-3C) after matching the word "qrs, which ends at a probable string ending in text 10, immediately before a word separator. Then iteration 3C illustratively finds a starting point for iteration 4 (SP-4C), immediately after the word separator following the word "qrs".

FIG. 1 illustrates several features of the iterations in box 20: Each iteration has a starting point in the text. Each iteration determines whether its starting point is followed by a character string that matches any of the selected strings and that ends at a probable string ending. Each iteration finds the next iteration's starting point at a probable string beginning.

In FIG. 2, each of a series of iterations includes the general acts in boxes 50 and 52. The act in box 50 determines whether the iteration's starting point in a text is followed by a character string that matches any of a list of selected strings and that ends at a probable string ending. The act in box 52 then finds the next iteration's starting point at a probable string beginning.

In addition to the acts shown in FIG. 2, the series of iterations could optionally be preceded by an additional act that finds an initial starting point, as shown by dashed box 54, and could optionally be followed by a last iteration that ends with or without finding a starting point for a next iteration, as shown by the dashed lines exiting after boxes 50 and 52.

Machine 70 in FIG. 3 includes processor 72 connected for obtaining text 74 and also connected for accessing data in memory 76. Processor 72 is also connected for receiving data through data input circuitry 78, which can illustratively provide data received from connections to memory 80, storage medium access device 82, or network 84. Processor 72 therefore could be the central processing unit (CPU) of a personal computer, workstation, or server, or any other processing device with connections as shown.

Text 74 can take any appropriate form, such as a series of character codes defining a text. Text 74 could be obtained from any appropriate source, including user input circuitry (not shown), memory 76, or data input circuitry 78.

Processor 72 can also be connected for providing data through data output circuitry 86, which could provide data through connections to components similar to those from which data input circuitry 78 can receive data or to other output devices such as displays and printers.

Body of data 90 illustratively provided by data input circuitry 78 includes list of selected character strings 92 and instruction data 94. List of selected character strings 92 could, for example, be any appropriate structure for indicating a list of character strings, such as a finite state data structure.

In executing the instructions indicated by instruction data 94, possibly after loading list 92 into memory 76, processor 72 automatically searches text 74 to find character strings that match any of the selected character strings in list 92. In doing so, processor 72 performs a series of iterations, and each iteration in the series determines whether its starting point is followed by a matching character string that ends at a probable string ending. Each iteration also finds a starting point for a next iteration at a probable string beginning.

As noted above, FIG. 3 illustrates three possible sources from which data input circuitry 78 could provide data to processor 72—memory 80, storage medium access device 82, and network 84.

Memory 80 could be any conventional memory within machine 70, including random access memory (RAM) or read-only memory (ROM), or could be a peripheral or remote memory device of any kind.

Storage medium access device 82 could be a drive or other appropriate device or circuitry for accessing storage medium 96, which could, for example, be a magnetic medium such as a set of one or more tapes, diskettes, or floppy disks; an optical medium such as a set of one or more CD-ROMs; or any other appropriate medium for storing data. Storage medium 96 could be a part of machine 70, a part of a server or other peripheral or remote memory device, or a software product. In each of these cases, storage medium 96 is an article of manufacture that can be used in a machine.

Network 84 can provide a body of data from machine 100. Processor 102 in machine 100 can establish a connection with processor 72 over network 84 through network connection circuitry 104 and data input circuitry 78. Either processor could initiate the connection, and the connection could be established by any appropriate protocol. Then processor 102 can access a body of data stored in memory 106 and transfer the body of data to processor 72 over network 84. Processor 72 can store the body of data in memory 76 or elsewhere, and can then execute the instructions to automatically search text 74 to find strings that match any of the selected character strings.

C. Implementation

The general features described above could be implemented in numerous ways on various machines to automatically search text to find character strings that match a list of selected strings. The implementations described below have been implemented on a Sun workstation running under Solaris and executing code compiled from C source code and source code in other standard programming languages.

C.1. System

Figure 4:
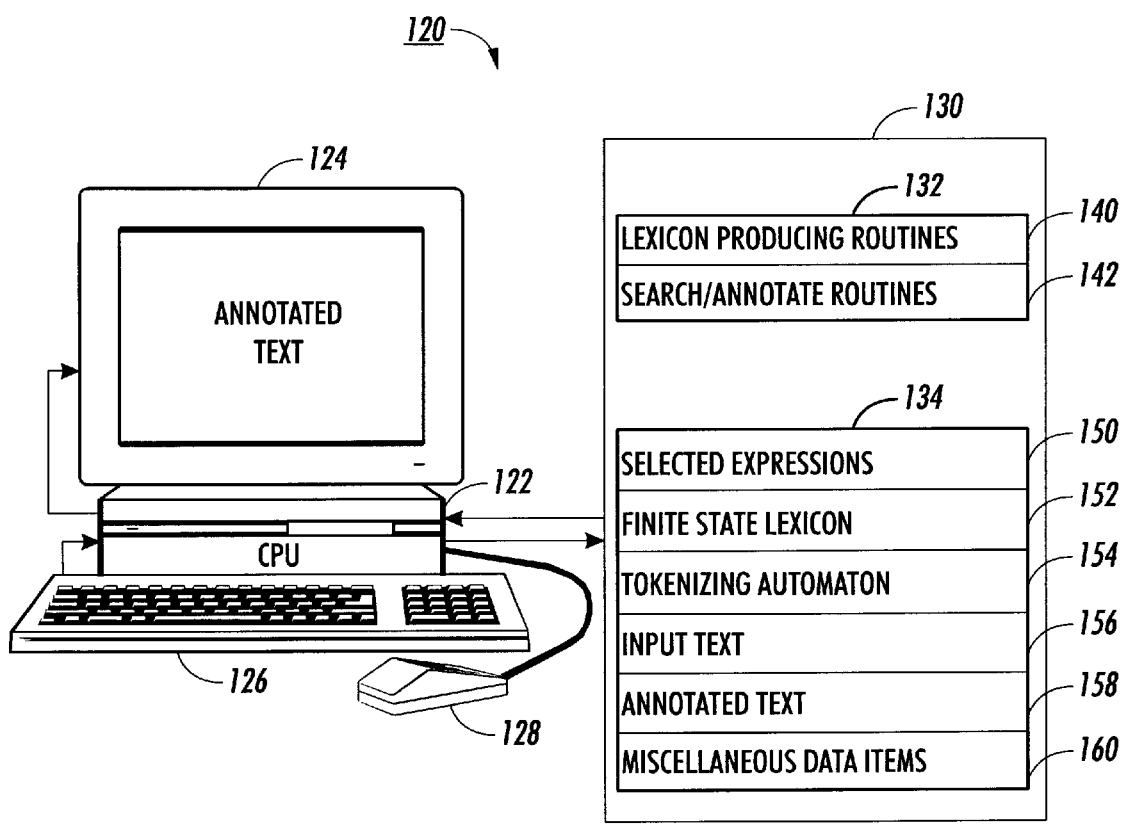
FIG. 4 is a schematic diagram of a system in which the general acts in FIG. 2 have been implemented.

In FIG. 4, system 120 includes the central processing unit (CPU) 122 of a Sun workstation, which is connected to display 124 for presenting images and to keyboard 126 and mouse 128 for providing signals from a user. CPU 122 is also connected so that it can access memory 130, which can illustratively include program memory 132 and data memory 134.

The routines stored in program memory 132 can be grouped into a few main functions, two of which are illustrated—lexicon producing routines 140 and search/annotate routines 142. FIG. 4 also shows several items of data stored in data memory 134 and accessed by CPU 122 during execution of routines in program memory 132—selected expressions 150; lexicon 152; tokenizing automation 154; input text 156; annotated text 158; and miscellaneous data items 160, some of which are described below.

In executing lexicon producing routines 140, processor 122 can receive and store selected expressions 150, which can be typed using keyboard 126, selected using mouse 128 from a list presented on display 124, retrieved from a file in data memory 134 or elsewhere, or obtained in any other appropriate way. Processor 122 can then use selected expressions 150, which can include both MWEs and also single words, to produce finite state lexicon 152, which can be one of a number of types of finite state data structures and which accepts only the expressions included in selected expressions 150. Finite state lexicon 152 is therefore an implementation of list 92 in FIG. 3, and, as shown in FIG. 3, could alternatively be received through data input circuitry from a source outside of system 120.

Processor 122 can also obtain tokenizing automation 154 from a source outside of system 120. Although it would be possible and within the scope of the invention to produce tokenizing automation 154, the implementations that have been made up to now use conventional finite-state automation tokenizers produced for other purposes, as described in the Chanod and Tapanainen articles described above, all of which are incorporated herein by reference. Various techniques for producing and using FSA tokenizers have been described, such as in U.S. Pat. No. 5,721,939, incorporated herein by reference. Processor 122 could thus receive tokenizing automation 154 from data input circuitry as described above in relation to FIG. 3, and could store it in data memory 134.

Similarly, processor 122 can independently obtain and store input text 156. Alternatively, processor 122 could receive input text 156 in real time and perform search and annotation without storing more than a buffer of character codes in data memory 134.

In executing search/annotate routines 142, processor 122 can use input text 156, finite state lexicon 152, and tokenizing automation 154 to automatically search for character strings in input text 156 that match any of selected expressions 150. Search/annotate routines 142 thus implement the acts in boxes 50 and 52 in FIG. 2, and are an implementation of instructions 94 in FIG. 3.

Upon finding a matching string, search/annotate routines 142 also determine whether to perform an operation relating to the matching string. More specifically, routines 142 determine whether to annotate input text 156 by inserting an annotation in association with the matching string. The annotation can include information accessed in lexicon 152, information accessed in miscellaneous data items 160, or information obtained from elsewhere. Routines 142 thus produce annotated text 156, which can be provided as output, such as by presenting it on display 124.

C.2. Producing Finite State Lexicons

Lexicon producing routines 140 could produce finite state lexicon 152 from selected expressions 150 in a number of different ways. Two broad categories of lexicons that are mentioned below are finite state transducers (FSTS) and finite state automatons (FSAs), both of which are examples of finite state data structures.

Routines 140 could produce a two-level FST using techniques like those described in Karttunen, L., "Constructing Lexical Transducers", in *Proceedings of the 15th International Conference on Computational Linguistics, Coling 94, Kyoto, Japan*, 1994, pp. 406–411, incorporated herein by reference. One level of the FST could accept all of selected expressions 150, and the other level could provide any of several different kinds of output. For example, selected expressions 150 could include surface forms of expressions, and the output level of the FST could provide the base form of each expression together with information about its lexical properties, such as part of speech. Or the output level could provide, for each selected expression, an annotation, such as a translation, a URL or other handle for accessing related information, and so forth. Or the output level could provide an index for use in accessing an annotation or other related information.

Routines 140 could instead produce an FSA that can be used to perform word/number mapping (W/N FSA), as described in U.S. Pat. No. 5,754,847, incorporated herein by reference. The W/N FSA could, when accessed with any of selected expressions 150, provide a unique number for the expression. This number could then be used to access related information, such as an annotation. The W/N FSA could accept all of the selected expressions, or, if used in combination with an FST that obtains base forms of expressions, it could accept only the base forms, as discussed below.

C.3. Lexicon-First Search

Figure 5:
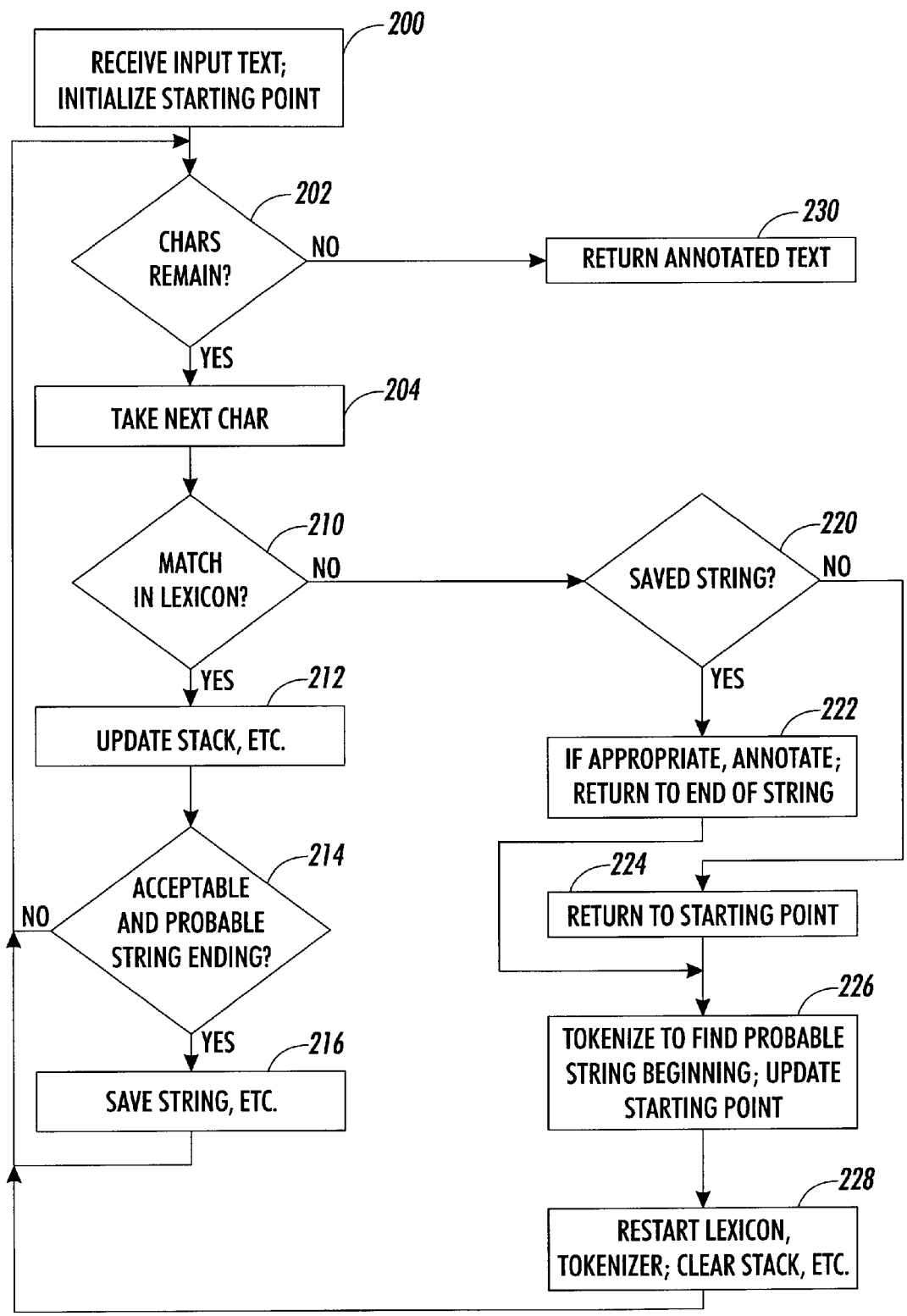
FIG. 5 is a flow chart showing one way search and annotation can be implemented in the system of FIG. 4.

FIG. 5 illustrates general acts that processor 122 could perform in one implementation of search/annotate routines 142. In this implementation, each iteration first attempts to match a string of characters with lexicon 152, and, when it fails to match, uses tokenizer 154 to find the next iteration's starting point. In this implementation, lexicon 152 is assumed to be deterministic, with each state having at most one outgoing transition for each character.

The act in box 200 begins by receiving input text 156 or a handle that can be used to access input text 156, which could be part of a call to search/annotate routines 142. The act in box 200 also initializes a starting point to begin at an appropriate position in input text 156, such as at the first character.

The act in box 202 then begins an iterative loop that is performed for each character of input text 156. As can be understood from the explanation below, the character-level iterations can be grouped into string-level iterations, each of which has a starting point in input text 156. Some string-level iterations determine that a string from input text 156 matches one of the selected expressions in lexicon 152, while others determine that a string does not match any of the selected expressions.

Each character-level iteration begins by taking the next character of input text 156, in box 204. The act in box 210 then uses the character from box 204 to access lexicon 152. If the character is the first character in a string-level iteration, the act in box 210 will attempt to match the character with the outgoing transitions of the start state of lexicon 152. If the character is a subsequent character in a string-level iteration, the act in box 210 will attempt to match the character with the outgoing transitions of the current state of lexicon 152, resulting from the previous character-level iteration.

If the act in box 210 successfully matches the character in lexicon 152, the act in box 212 updates a stack and other items of data in miscellaneous data items 160 for subsequent use. If lexicon 152 is an FST, the stack can hold both the input and output strings of the FST since the last string-level iteration was completed. If lexicon 152 is a W/N FSA, the stack can hold the string of inputs to the FSA since the last string-level iteration was completed, and a count of string endings can also be kept for mapping purposes.

The act in box 214 determines whether the current string is acceptable, meaning that it is one of selected expressions 150, and also whether it is followed in input text 156 by a probable string ending. To determine whether the current string is acceptable, the act in box 214 can determine whether the state reached by taking a matching transition in box 210 led to a state that can follow an acceptable string, as can be indicated by acceptance data associated with the state. To determine whether the current string is followed by a probable string ending, the act in box 214 could use tokenizer 154, but that might not be as efficient as other techniques. For example, lexicon 152 could include, after every state that ends an acceptable string, a branch that can check the next characters of input text 156 for a probable string ending such as a space or punctuation mark. Or a specialized data structure in miscellaneous data items 160 could be accessed to check for a token break or other probable string ending in input text 156 after reaching such a state.

If the current string is not an acceptable string or if it is not followed by a probable string ending, the current character-level iteration is completed, and the next character-level iteration begins in box 202.

When the current string is acceptable and followed by a probable string ending, the act in box 216 saves the current string because it could be appropriate for annotation. The act in box 216 may also save other relevant data, such as the ending position of the current string in input text 156. Then the next character-level iteration begins in box 202.

Character-level iterations continue as described above until the act in box 210 fails to match a character in input text 156. This means that a string-level iteration can be completed, because the end of a matching string of characters has been reached.

The act in box 220 branches based on whether a string has been saved in box 216. If so, the starting point of the current string-level iteration is followed by at least one string that matches one of selected expressions 150, the longest of which is the last one saved. The act in box 222 therefore annotates, if appropriate, and returns the current position in input text 156 to the end of the saved string.

If lexicon 152 is an FST, the act in box 222 can include, for example, inserting an annotation directly from the output string or an annotation accessed using data from the output string. Related techniques for accessing a database using an FST are disclosed in copending, coassigned U.S. patent application Ser. No. 08/746,684, entitled "Indexing a Database by Finite-State Transducer", incorporated herein by reference. If lexicon 152 is a W/N FSA, the act in box 222 can include inserting an annotation accessed using the number to which the saved string was mapped. In either case, the annotation can follow the saved string in the input text or be associated with it in another appropriate way. Indeed, the annotation could even replace the saved string.

The act in box 222 can also include applying a criterion to determine whether annotation is appropriate. For example, if the FST output or the number from the W/N FSA does not include an annotation, the criterion could determine that annotation is inappropriate. Other criteria could be based on whether the same string has previously been annotated, and so forth.

A problem can arise if selected expressions 150 include different surface forms of a base form, such as the plural and the singular. The different surface forms can have different indices but the same annotation. Therefore, it would be necessary to somehow convert the indices of the surface forms to the same index for accessing the annotation.

In one variation that avoids this problem, lexicon 152 can be a lemmatizing FST that receives selected expressions that are surface forms of words and MWEs and provides the counterpart base forms or lemmas together with part of speech. The determination of whether to annotate can thus depend in part on part of speech. In this variation, miscellaneous data items 160 can include a word/number mapping FSA that maps each of the lemmas provided by lexicon 152 to a number, which can then be used to access an annotation for any of the counterpart surface forms. The saved string from box 216 can indicate a base form for one of the selected expressions that has been matched, and the act in box 222 can therefore use the base form to access the annotation for the selected expression.

If, on the other hand, no string has been saved in box 216, the starting point of the current string-level iteration is not followed by a matching string. The act in box 224 simply returns the current position to the starting point of the current string-level iteration.

In either case, the act in box 226 uses tokenizer 154 to find the next probable string beginning after the current position in input text 156, and updates the starting point to that position for the next string-level iteration. Finally, before the end of each string-level iteration, the act in box 228 performs any operations necessary to prepare for the next string-level iteration, such as returning to the start states of lexicon 152 and tokenizer 154 and clearing the stack and a mapping count, if any.

Finally, when all the characters of input text 156 have been handled, the act in box 230 returns annotated text 158, which now includes any annotations inserted in box 226. Annotated text 158 can then be presented on display 124 in any appropriate manner. For example, each of the selected expressions can be highlighted, such as by being presented in a different color than other words, and can be linked to an HTML file that contains an HTML page that is presented in response to signals from a user selecting the highlighted expression. In the variation in which base forms are obtained and used to obtain numerical indices to annotations, the presentation can also include a list of the selected expressions that occur in the text, each expression's base form, and the numerical index of the base form that was used to access the HTML file. Each base form's HTML page can be automatically created from an image or other annotation related to the base form, using conventional techniques, and can be a blank page or a page with an appropriate error message if the base form has no annotation.

C.4. Tokenizer-First Search

Figure 6:
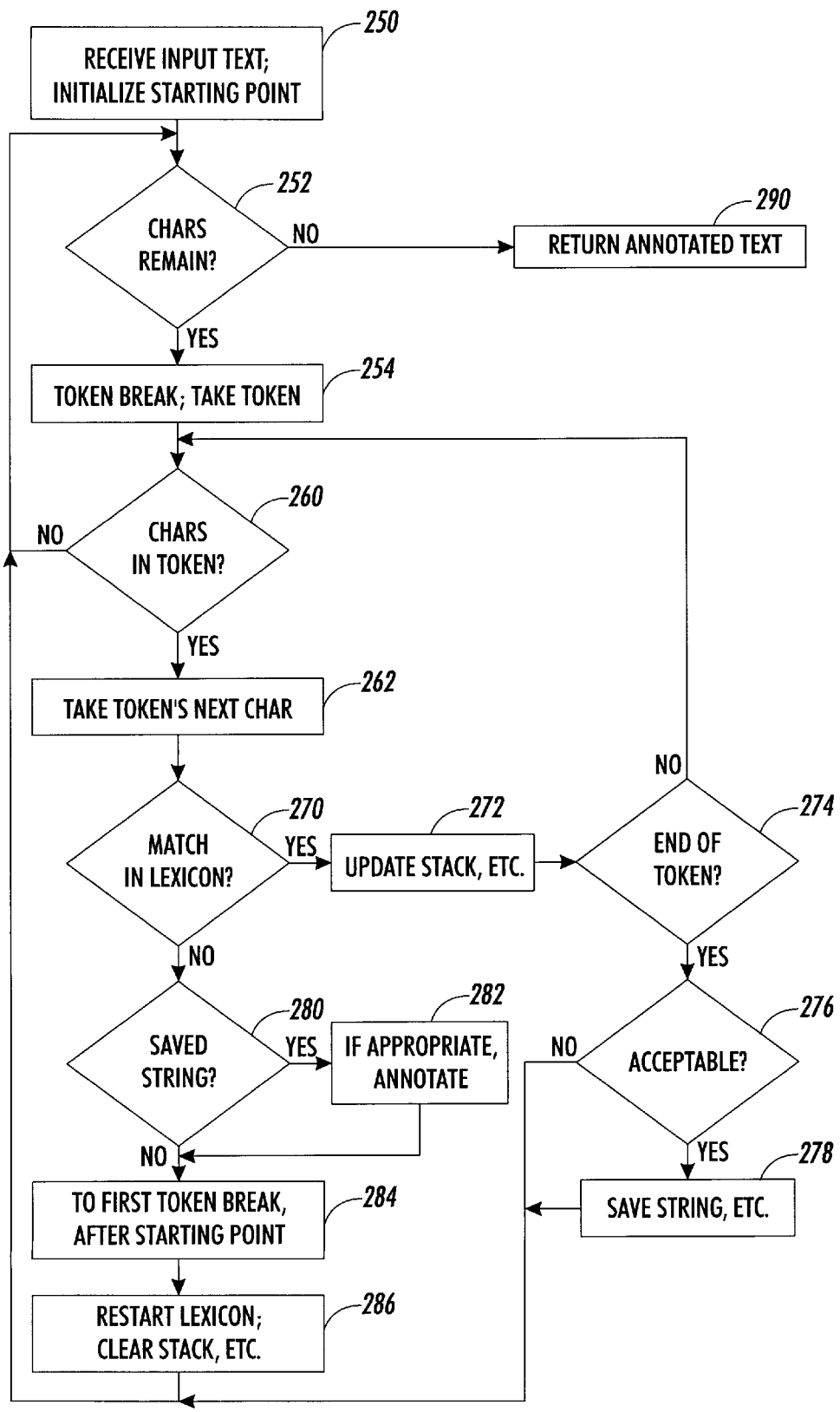
FIG. 6 is a flow chart showing another way search and annotation can be implemented in the system of FIG. 4.

FIG. 6 illustrates general acts that processor 122 could perform in another implementation of search/annotate routines 142. In this implementation, an outer iterative loop tokenizes, after which an inner iterative loop attempts to match a token's string of characters with lexicon 152, and, when it fails to match, uses the next token break after the previous starting point as the next starting point. In this implementation, lexicon 152 is again assumed to be deterministic, with each state having at most one outgoing transition for each character.

The act in box 250 begins by receiving input text 156 or a handle that can be used to access input text 156, which could be part of a call to search/annotate routines 142. The act in box 250 also initializes a starting point to begin at an appropriate position in input text 156, such as at the first character.

The act in box 252 then begins the outer iterative loop that tokenizes. As can be understood from the explanation below, the outer iterations can be grouped into string-level iterations, each of which has a starting point in input text 156. Some string-level iterations determine that a string from input text 156 matches one of the selected expressions in lexicon 152, while others determine that a string does not match any of the selected expressions.

Each outer iteration begins by tokenizing from the next character of input text 156, in box 254. When the act in box 254 reaches a token break, the token that has been found is then taken for further processing in a series of inner iterations that begin in box 260.

The act in box 262 takes the token's next character, and the act in box 270 then uses the character from box 262 to access lexicon 152. The act in box 270 will attempt to match the character with the outgoing transitions of the current state of lexicon 152, which will be the start state if a new string-level iteration is just beginning, but otherwise will be a current state resulting from the previous transitions.

If the act in box 270 successfully matches the character in lexicon 152, the act in box 272 updates a stack and other items of data in miscellaneous data items 160 for subsequent use, similarly to box 212 in FIG. 5.

The act in box 274 determines whether the current string is at the end of a token. If not, the current inner iteration is completed, and the next inner iteration begins in box 260.

If the end of the token has been reached, however, the current inner iteration is the last in the current outer iteration. Before beginning the next outer iteration in box 252, the act in box 276 determines whether the current string is acceptable, meaning that it is one of selected expressions 150. To determine whether the current string is acceptable, the act in box 276 can determine whether the state reached by taking a matching transition in box 270 led to a state that can follow an acceptable string, as can be indicated by acceptance data associated with the state.

When the current string is acceptable and at the end of a token, the act in box 278 saves the current string because it could be appropriate for annotation. The act in box 278 may also save other relevant data. Then, since the end of a token has been reached, the next outer iteration begins in box 252.

Outer and inner iterations continue as described above until the act in box 270 fails to match a character in input text 156. This means that a string-level iteration can be completed, because the end of a matching string of characters has been reached, possibly a string with more than one tokens.

The act in box 280 branches based on whether a string has been saved in box 276. If so, the starting point of the current string-level iteration is followed by at least one string that matches one of selected expressions 150, the longest of which is the last one saved. The act in box 282 therefore annotates, if appropriate, as described above in relation to box 222 in FIG. 5. In either case, the act in box 284 sets the next string-level iteration's starting point to the first token break after the current starting point, which will have been found in box 254. The act in box 284 can also perform any operations necessary to prepare for the next string-level iteration, such as returning to the start states of lexicon 152 and tokenizer 154 and clearing the stack and a mapping count, if any.

Finally, when all the characters of input text 156 have been handled, the act in box 290 returns annotated text 158, as in box 230 in FIG. 5.

C.5. Variations

The implementations described above could be varied in many ways within the scope of the invention.

The implementations described above have been successfully executed on Sun workstations, but implementations could be executed on other machines.

The implementations described above have been successfully executed using source code written in C and other programming languages on the Solaris platform, but other programming environments and platforms could be used.

The implementations described above follow two distinct approaches, referred to above as "lexicon-first search" and "tokenizer-first search", but these are only two examples of a broad class of techniques that could be used to implement the invention. In these examples, search for probable string endings, such as with a tokenizer, and search for a match, such as with a lexicon, are performed together in a way that finds strings that match and end at probable string endings. The particular techniques described above further find the longest matching string that ends at a probable string ending, but the invention could be implemented with many other techniques, and need not search for the longest matching string.

The implementations described above use finite state lexicons such as FSTs (which may be referred to as "dedicated lexical transducers") and W/N FSAs to determine whether a character string matches any of a list of selected strings. More specifically, the implementations described above use deterministic finite state lexicons. The invention could, however, be implemented to determine whether a character string matches in other ways, and nondeterministic finite state lexicons could be used, with appropriate backtracking techniques. The above implementations require an exact match, but the invention could be implemented with weaker criteria for matching.

In the implementations described above, a finite state lexicon can be produced on the same machine on which search is performed, but a lexicon or other resource defining a list of selected strings could be prepared at a different place or time and provided in any appropriate way to a machine that is performing search. Furthermore, search as described above could be performed remotely, in response to an input text, such as through a client/server protocol, rather than being performed on the machine that receives the request for search.

The implementations described above use preexisting tokenizing automatons defined by simple regular expressions to find a starting point for a next iteration, but the invention could be implemented to find starting points in other ways, such as by following additional transitions and states of a finite state lexicon used for matching, by accessing a finite state data structure that finds features other than token breaks, by accessing a specially-created tokenizing automaton, or by applying an appropriate algorithm. Furthermore, the implementations described above go forward from a previous iteration's starting point to find a next iteration's starting point, but a next iteration's starting point could be found beginning at the current position or other positions, some of which are illustrated in FIG. 1 above, and could be found by going backward rather than forward.

Although it might be possible to compose a tokenizing automaton with a finite state lexicon, this would lead to time and space problems. Therefore, it appears advantageous to use a tokenizer and lexicon separately, for compactness and speed.

The implementations described above involve selected expressions and matching character strings that are words or MWEs and detect probable string beginnings and endings using tokenizing automatons and various other techniques that detect probable beginnings and endings of words. The MWEs could, for example, include dates, cross-references, or other expressions with a sequence of known words or with numbers in a particular pattern. The invention is not limited, however, to words and MWEs, but could be applied to search for character strings matching sentences or other types of selected expressions, such as SGML or XML tags. Also, probable string beginnings and endings could be detected in any way appropriate to the types of character strings and selected expressions being matched.

A list of selected strings could be obtained in any appropriate way, and could, for example, be a list of technical expressions; a list of expressions specific to a company or to a given domain; a list of proper names; a list of references that are likely to be hyperlinked such as scientific references or citations or cross references to other documents or appropriate registered names for linking to logos or for font changes; a list of defined terms, such as legal terms; a list of words that are likely to appear as part of a cross-reference, such as "see"; or a list of the expressions in a specific text, such as a legal warning; or any other such list.

The implementations described above annotate an input text when appropriate, but various other operations relating to a matching character string could be performed, including replacing each matching string with its translation or an updated version, saving the location at which or an identifier of the document in which a matching string is found, and highlighting each matching string. Some other examples of operations are described below in relation to applications of the invention.

Also, annotations could be inserted in various ways in addition to the ways described above, and the annotations themselves could take a wide variety of forms, including translations (with or without tags providing morpho-syntactic or semantic information), definitions, domain identifiers, and hyperlinks or other items of data for providing access to related information, such as interactive aids, help screens, images, diagrams, instructions, on-line multimedia documents, and so forth. More than one annotation could be provided for a given expression. A decision whether to annotate could be made automatically, based on a criterion such as nearby words; position in document, e.g. title; or manner of presentation, e.g. highlighting as indicated by SGML tags; and so forth. A decision whether to annotate, rather than being automatic, could be made interactively by presenting the possible alternatives to the user and receiving a signal indicating an alternative selected by the user.

The implementations described above have been applied to French, in some cases obtaining annotations in English, but the invention can be applied to languages other than French and English in which probable string beginnings and endings can be detected.

In the implementations described above, specific acts are performed that could be omitted or performed differently. For example, data could be saved in a data structure other than a stack.

In the implementations described above, acts are performed in an order that could be modified in many cases. For example, each character of a string could be concurrently used to make a transition in the finite state lexicon and in the tokenizing automaton, rather than doing tokenizing first or lexicon lookup first as described above.

The implementations described above use currently available computing techniques, but could readily be modified to use newly discovered computing techniques as they become available.

D. Applications

As mentioned above, the invention can be applied to perform annotation in various ways.

An on-line application could be provided that automatically annotates text segments with extra information, such as translations (to one or more languages) or pointers to definitions, help screens, pictures, or any relevant multimedia document. The annotations could be hyperlinks in a World Wide Web application or could be interactive aids for consulting on-line documents such as technical manuals, providing the user with translations of technical terms, or access to instructions, diagrams, etc., or a combination of these.

In a multimedia application, documents can be indexed by keywords that would be recognized by an FST at one level, and the FST could provide as output a pointer to an indexed document, including documents distributed over networks.

Translation of technical terms is a useful application, because technical terms tend to convey non-ambiguous information, but they may also be difficult to grasp for a non-native speaker. An application for providing translations of technical terms can use a finite state lexicon prepared from a multilingual terminology database. In a prototype, preexisting bilingual terminological databases of several thousand terms from various domains were used to produce FSTs, any of which could be inverted to produce an FST for the opposite language pair.

For example, an FST could include only the terms "transmission oil level", "suction strainer", and "hydraulic oil filter" on an input level, with the output level providing their French translations, "niveau d'huile de transmission", "crepine d'aspiration", and "filtre a huile hydraulique", possibly with morpho-syntactic tags or part-of-speech tags. The sentence "Check the transmission oil level, clean the suction strainer, and change the hydraulic filter." would result in three annotations, possibly with tags as follows:

"Check the niveau d'huile de transmission <French Masc Sing Noun>, clean the crépine d'aspiration <French Fem Sing Noun>, and change the filtre á huile hydraulique <French Masc Sing Noun>."

This application could be extended to more general multiword expressions, such as idioms or translation memory items, which could serve as a useful preliminary step for a translation system.

In another prototype, a set of selected expressions including both single words and MWEs was used to produce an FST that maps each expression to a base form. Each base form was assigned an index, and a mapping data structure was also produced for mapping each base form to its index. Images relating to base forms were made accessible with the appropriate indices. The annotations provided hypertext links to the images.

The invention might also be applied in a digital copying machine in which optical character recognition can be performed on documents and annotations can be added before printing.

The invention might also be applied in a Web page rewriter.

The invention could also be applied in a development environment such as the Xerox Linguistic Development Architecture (XeLDA), features of which are described in copending, coassigned U.S. Patent Application No. 09/221, 232, entitled "Executable for Requesting a Linguistic Service" and incorporated herein by reference.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of automatically finding selected character strings in text and providing information relating to the selected character strings; the method comprising:

(A) automatically searching a text to find character strings that match any of a list of selected strings; the act of automatically searching comprising a series of iterations, each iteration having a starting point in the text, each iteration comprising:

(A1) determining whether the iteration's starting point is followed by a character string that matches any of the list of selected strings and that ends at a probable string ending; said determining further comprising:

accessing a finite state data structure with a character string following the iteration's starting point; the finite state data structure including acceptance data that can be accessed at the end of one of the selected strings, and determining that the character string matches one of the selected strings if, at the end of the character string, the acceptance data can be accessed;

(A2) finding a starting point for a next iteration in the series, the next iteration's starting point being a probable string beginning; and (A3) if the iteration's starting point is followed by a character string matching one of the selected strings and ending at a probable string ending, performing an operation relating to the matching character string;

in which the finite state data structure is a finite state transducer with a string matching level and an information output level; the act of accessing the finite state data structure with the character string being performed at the string matching level; the finite state transducer providing information output data at the information output level in response to the character string; and in which the information output data is access data for accessing information relating to the matching character string.

2. A method of automatically finding selected character strings in text and providing information relating to the selected character strings; the method comprising:

(A) automatically searching a text to find character strings that match any of a list of selected strings; the act of automatically searching comprising a series of iterations, each iteration having a starting point in the text, each iteration comprising:

(A1) determining whether the iteration's starting point is followed by a character string that matches any of the list of selected strings and that ends at a probable string ending; said determining further comprising:

accessing a finite state data structure with a character string following the iteration's starting point; the finite state data structure including acceptance data that can be accessed at the end of one of the selected strings, and determining that the character string matches one of the selected strings if, at the end of the character string, the acceptance data can be accessed;

(A2) finding a starting point for a next iteration in the series, the next iteration's starting point being a probable string beginning; and (A3) if the iteration's starting point is followed by a character string matching one of the selected strings and ending at a probable string ending, performing an operation relating to the matching character string;

in which the finite state data structure is a finite state automaton that can be accessed with any of a set of acceptable character strings to obtain a counterpart number to which the acceptable character string maps; each acceptable character string in the set being one of the list of selected strings; and further in which the counterpart number is for accessing information relating to the matching character string.

3. The method of claim 2 in which (A3) comprises:

determining whether the matching character string is the longest character string that begins at the iteration's starting point, that ends at a probable string ending, and that matches one of the selected strings.

4. The method of claim 2 in which (A3) comprises:

determining whether to retrieve information associated with the matching character string.

5. The method of claim 4 in which the associated information is an annotation and in which (A3) further comprises:

upon determining to retrieve the associated information, inserting the annotation into the text at a position associated with the matching character string; the series of iterations producing an annotated version of the text;

the method further comprising:

(B) providing the annotated version of the text as output.

6. The method of claim 1 in which (A2) comprises:

performing tokenization on the text to find the next iteration's starting point.

7. The method of claim 6 in which tokenization is performed using a finite state tokenizer.

8. The method of claim 1 in which (A2) comprises:

performing tokenization on the text to find the next iteration's starting point.

9. The method of claim 8 in which tokenization is performed using a finite state tokenizer.

10. The method of claim 1 in which each of the selected strings is a word or a multi-word expression.

11. A system for automatically finding selected character strings in text and providing information relating to the selected character strings, the system comprising:

text data defining a text;

a list of selected character strings; and a processor connected for accessing the text data and the list of selected character strings; the processor automatically searching the text to find character strings that match any of the list of selected strings; in automatically searching, the processor performing a series of iterations, each having a starting point in the text; in each iteration, the processor operating to:

determine whether the iteration's starting point is followed by a character string that matches any of the list of selected strings and that ends at a probable string ending; and in which the processor further operates to:

access a finite state data structure with a character string following the iteration's starting point; the finite state data structure including acceptance data that can be accessed at the end of one of the selected strings, and determine that the character string matches one of the selected strings if, at the end of the character string, the acceptance data can be accessed;

find a starting point for a next iteration in the series, the next iteration's starting point being a probable string beginning; and if the iteration's starting point is followed by a character string matching one of the selected strings and ending at a probable string ending, performing an operation relating to the matching character string;

in which the finite state data structure is a finite state transducer with a string matching level and an information output level, the act of accessing the finite state data structure with the character string being performed at the string matching level; the finite state transducer providing information output data at the information output level in response to the character string; and in which the Information output data is access data for accessing information relating to the matching character string.

12. The method of claim 1 in which (A3) comprises:

determining whether the matching character string is the longest character string that begins at the iteration's starting point, that ends at a probable string ending, and that matches one of the selected strings.

13. The method of claim 1 in which (A3) comprises:

determining whether to retrieve information associated with the matching character string.

14. The method of claim 13 in which the associated information is an annotation and in which (A3) further comprises:

upon determining to retrieve the associated information, inserting the annotation into the text at a position associated with the matching character string; the series of iterations producing an annotated version of the text;

the method further comprising:
(B) providing the annotated version of the text as output.

15. The method of claim 2 in which (A2) comprises:

performing tokenization on the text to find the next iteration's starting point.

16. The method of claim 15 in which tokenization is performed using a finite state tokenizer.

17. The method of claim 2 in which each of the selected strings is a word or a multi-word expression.

18. A system for automatically finding selected character strings in text and providing information relating to the selected character strings, the system comprising:

text data defining a text;

a list of selected character strings; and a processor connected for accessing the text data and the list of selected character strings; the processor automatically searching the text to find character strings that match any of the list of selected strings; in automatically searching, the processor performing a series of iterations, each having a starting point in the text; in each iteration, the processor operating to:

determine whether the iteration's starting point is followed by a character string that matches any of the list of selected strings and that ends at a probable string ending; and in which the processor further operates to:

access a finite state data structure with a character string following the iteration's starting point; the finite state data structure including acceptance data that can be accessed at the end of one of the selected strings, and determine that the character string matches one of the selected strings if, at the end of the character string, the acceptance data can be accessed;

find a starting point for a next iteration in the series, the next iteration's starting point being a probable string beginning; and if the iteration's starting point is followed by a character string matching one of the selected strings and ending at a probable string ending, performing an operation relating to the matching character string;

in which the finite state data structure is a finite state automaton that can be accessed with any of a set of acceptable character strings to obtain a counterpart number to which the acceptable character string maps; each acceptable character string in the set being one of the list of selected strings; and further in which the counterpart number is for accessing information relating to the matching character string.

* * * * *